US012316680B2

(12) United States Patent
Seeber et al.

(10) Patent No.: US 12,316,680 B2
(45) Date of Patent: *May 27, 2025

(54) INTEGRATED SECURITY AND THREAT PREVENTION AND DETECTION PLATFORM

(71) Applicant: CORVID CYBERDEFENSE LLC, Mooresville, NC (US)

(72) Inventors: Peter J. Seeber, Davidson, NC (US); Michael B. Viruso, Davidson, NC (US); Richard D. Ingersoll, Raleigh, NC (US)

(73) Assignee: CORVID CYBERDEFENSE LLC, Mooresville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,226

(22) Filed: Jul. 10, 2023

(65) Prior Publication Data

US 2024/0129342 A1 Apr. 18, 2024

Related U.S. Application Data

(63) Continuation of application No. 16/458,913, filed on Jul. 1, 2019, now Pat. No. 11,700,279.

(60) Provisional application No. 62/692,283, filed on Jun. 29, 2018.

(51) Int. Cl.
*H04L 9/40* (2022.01)
*G06F 21/57* (2013.01)

(52) U.S. Cl.
CPC ............ *H04L 63/20* (2013.01); *G06F 21/577* (2013.01); *H04L 63/1408* (2013.01); *H04L 63/1441* (2013.01)

(58) Field of Classification Search
CPC . H04L 63/20; H04L 63/1408; H04L 63/1441; G06F 21/577
See application file for complete search history.

(56) References Cited

U.S. PATENT DOCUMENTS

| 8,990,723 B1 * | 3/2015 | Lymer ...................... G06F 21/51 715/764 |
| 10,305,924 B2 * | 5/2019 | Marquardt ............ G06F 7/5443 |
| 2005/0042593 A1 * | 2/2005 | Hopkins .................. G09B 5/00 717/124 |

(Continued)

*Primary Examiner* — Ali S Abyaneh
(74) *Attorney, Agent, or Firm* — Myers Bigel, P.A.

(57) ABSTRACT

An integrated computer network security and threat prevention and detection platform includes a central processor and a display operable to aggregate and present data from a plurality of network security applications in an integrated dashboard format to a system administrator. The network security applications may be hardware, software, or hybrid applications running on local machines, local networks, remote machines, or remote networks, in communication with the central processor. In one embodiment implementation of the integrated computer network security and threat prevention and detection platform is performed on premises, in an alternative embodiment the integrated computer network security and threat prevention and detection platform is provided in an Internet or cloud-based environment, in other embodiments the computer system security platform is a hybrid configuration having both on-premises and cloud base components.

17 Claims, 6 Drawing Sheets

(56) References Cited

U.S. PATENT DOCUMENTS

| | | | | |
|---|---|---|---|---|
| 2008/0134335 | A1* | 6/2008 | Kameda | H04L 63/145 726/24 |
| 2014/0040998 | A1* | 2/2014 | Hsieh | G06F 21/45 726/5 |
| 2015/0073894 | A1* | 3/2015 | Leaute | G06Q 30/0248 705/14.47 |
| 2015/0213275 | A1* | 7/2015 | Reese | G06F 21/84 726/26 |
| 2015/0324093 | A1* | 11/2015 | Wada | G06F 3/04842 715/763 |
| 2015/0346989 | A1* | 12/2015 | Lee | G06F 3/04847 715/771 |
| 2017/0063905 | A1* | 3/2017 | Muddu | G06N 7/01 |
| 2017/0251013 | A1* | 8/2017 | Kirti | H04L 63/1441 |
| 2018/0157842 | A1* | 6/2018 | Holz | G06F 16/338 |
| 2018/0255080 | A1* | 9/2018 | Paine | H04L 63/1466 |
| 2019/0166152 | A1* | 5/2019 | Steele | H04L 63/1441 |
| 2019/0354686 | A1* | 11/2019 | Czaplewski | G06F 21/577 |

* cited by examiner

INTEGRATED SECURITY AND THREAT PREVENTION AND DETECTION PLATFORM

CROSS-REFERENCE TO RELATED APPLICATIONS

The present application is a continuation of U.S. application Ser. No. 16/458,913, filed on Jul. 1, 2019, which claims the benefit of priority to U.S. Provisional Application No. 62/692,283, filed on Jun. 29, 2018, and the entire contents of each above-identified application are incorporated by reference as if set forth herein.

BACKGROUND

Computer system security is of primary importance to every provider, user, and operator of computer systems and networks. Individual users of personal computers seek to protect their personal and private information from others while still desiring to freely run and operate software applications and freely access the Internet.

Business users similarly want their employees and contractors to freely run approved software applications and to communicate over approved local and wide area networks while simultaneously protecting the businesses' proprietary data and information, as well as protecting the local network and infrastructure from intrusion and unauthorized use.

The burden of security on businesses is heightened as a typical business implements internal networks with dozens, hundreds, or more, users that in turn typically connect to external networks and to the Internet. Each of those individual users presents a potential security risk through unauthorized download of malware or spyware, or unauthorized connection of external devices, and each of the computers or workstations connected to the network presents a potential access point for an unauthorized user or even hundreds of users.

The potential threat to businesses is heightened, as a data or security breach not only poses a loss of data and resources, but further exposes the business to potential financial liability to its customers which in turn affects the financial stability of the business.

In order to protect their data and computer systems, businesses typically employ an array of separate security tools, each designed to address a specific issue or threat, such as access control, firewalls, traffic monitors, and the like. Each of those separate applications typically runs individually, providing a control screen and a display to a system administrator comprising data related to that program's function. For example, a system administrator may run a specific security application to view and change firewall settings, may run a different program to monitor network traffic, may run yet another program to monitor email related threats, and run an additional application to scan for spyware or malware.

While generally effective, the operation of multiple individual applications is cumbersome and only provides a system administrator with separate and disparate views of what is occurring on a network. For example, viewing or detecting a potential email threat does not simultaneously provide the system administrator with any information related to concurrent network activity.

Thus, there remains a need in the art for an improved computer network security platform that provides an integrated view of concurrent system activity, configuration, and threats, in an easily controlled and managed environment.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used in isolation to determine the scope of the claimed subject matter. In brief, this disclosure describes, among other things, an integrated computer network security and threat prevention and detection platform.

The integrated computer network security and threat prevention and detection platform of the present invention provides an integrated dashboard view of information collected from a plurality of network security applications, such as firewall, network traffic monitoring, vulnerability scan, endpoint monitoring, email security tools, and the like. In an exemplary embodiment, a central processor in communication with each of the plurality of network security applications aggregates the data and information received from each of those applications and presents one or more dashboard views of the aggregated information to a system administrator or other user, allowing the user to view relevant information from multiple network security applications simultaneously. Additional network security applications can be easily integrated with the platform as needed or desired.

In one embodiment, the integrated computer network security and threat prevention and detection platform of the present invention includes a central processor in communication with a plurality of network security applications and operable to aggregate information from those multiple applications and present an integrated view of that aggregated information to a system administrator on a display screen.

In an exemplary embodiment, the integrated computer network security and threat prevention and detection platform is performed on premises, in an alternative embodiment the integrated computer network security and threat prevention and detection platform is provided in an Internet or cloud-based environment, in other embodiments the computer system security platform is a hybrid configuration having both on-premises and cloud base components.

In one aspect, the integrated computer network security and threat prevention and detection platform of the present invention provides an integrated viewing and control station dashboard to a system administrator, allowing the administrator to view, for every user of the network, subscriber services, threats, and analytics related to network usage. For example, a system administrator can view, and provide reports, related to network traffic, visited websites, detected threats, potential severity of detected threats, etc. by user, groups of users, and/or network(s) within the monitored system.

In another aspect, the integrated computer network security and threat prevention and detection platform of the present invention interfaces with Application Program Interfaces (APIs) and/or to ELK STACK™ (Elastisearch™, Logstash™, and Kibana™) of a plurality of network security applications or tools to collect, sort, aggregate, and filter data collected from those tools to present an integrated dashboard presentation of all system activity and threats to a system administrator.

DESCRIPTION OF THE DRAWINGS

Illustrative embodiments of the invention are described in detail below with reference to the attached drawing figures, and wherein.

DETAILED DESCRIPTION

Figure 1:
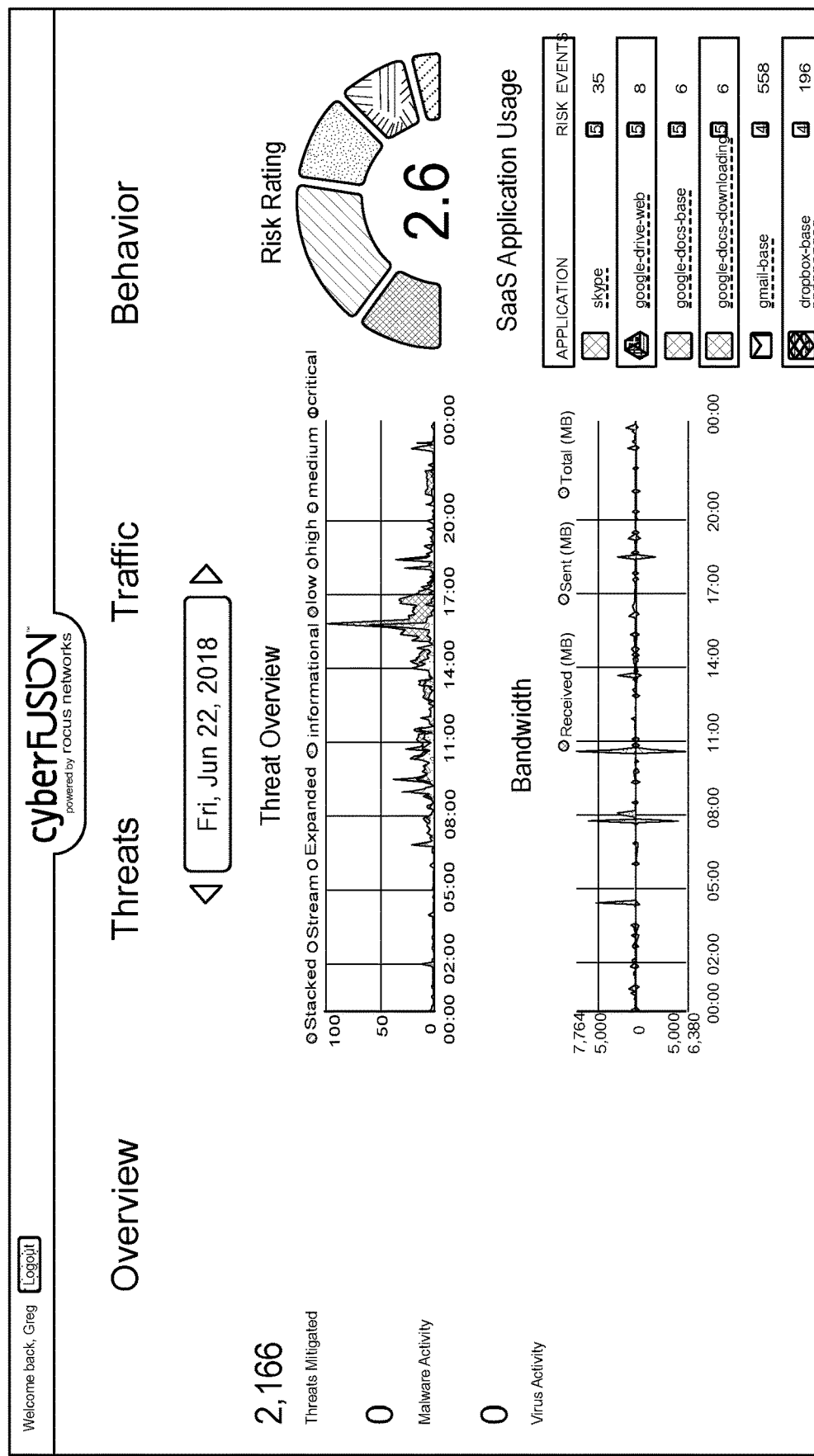
FIG. 1 is a screen shot of an interactive Overview display of network usage, network threats, and application usage of an integrated computer network security and threat prevention and detection platform in accordance with an exemplary embodiment of the present invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

An integrated computer network security and threat prevention and detection platform in accordance with an exemplary embodiment of the present invention provides an integrated dashboard view of sophisticated analytics related to network usage, traffic, and threats in order to allow a system administrator to proactively detect and monitor potential threats and provide reports on numerous aspects of network usage.

A typical small, medium, or large business entity typically has one or more local networks, typically in communication with the Internet, with each local network having numerous users, and each of those users having at least one computing device allowing access to network(s) as well as the data on that network, with each user typically having the ability to independently run programs on their computing devices and/or to access programs running on one or more servers also connected to the network(s). The network environment can include various types of servers such as file servers, web servers, application servers, database servers and email servers. Additionally, a network can include computing systems which can be any type of conventional computing system including desktops, laptops, tablets, smartphones, or any similar device used by personnel working for the business entity. Each user, device, and program provides a potential portal into the network(s) whereby a threat, such as malware, data breach, or unauthorized access, may be introduced into the network(s) and/or into the devices connected to the network(s).

Figure 6:
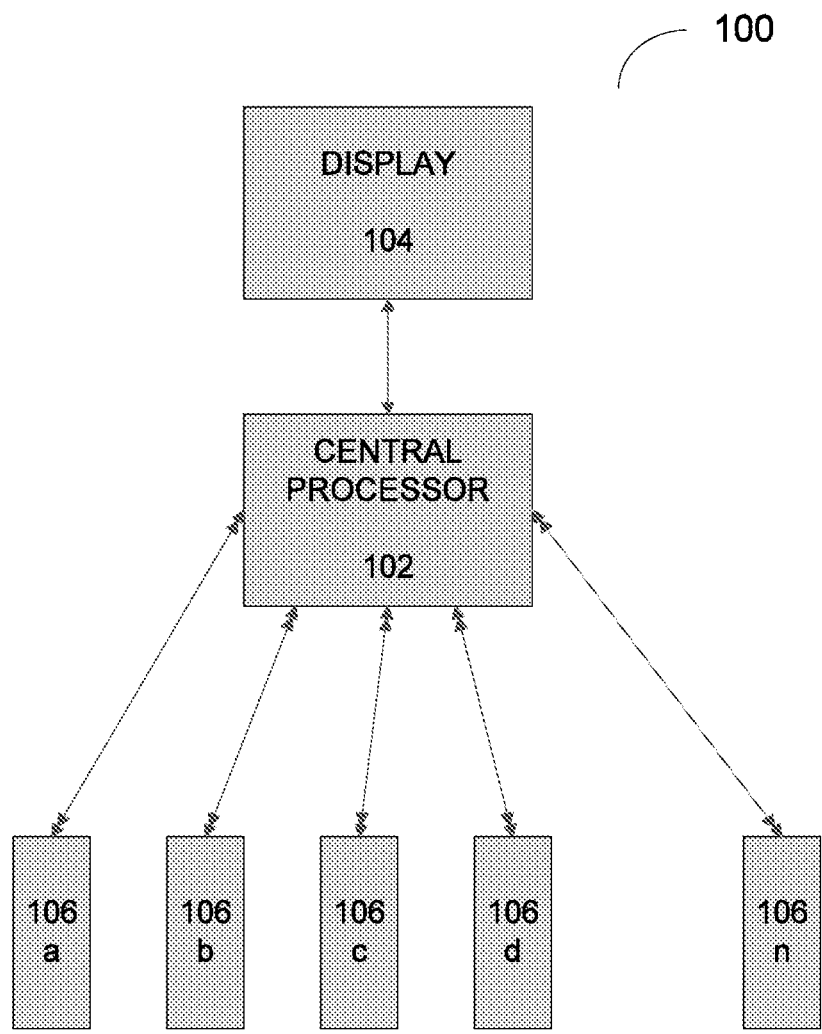
FIG. 6 is a block diagram of an integrated computer network security and threat prevention and detection platform in accordance with an exemplary embodiment of the present invention.

Looking first to FIG. 6, an exemplary embodiment of an integrated computer network security and threat prevention and detection platform is depicted generally by the numeral 100. The platform 100 includes a central processor 102 in communication with a display 104. The central processor is in further communication with a plurality of network security applications or tools 106a, 106b, 106c, 106d, through 106n.

The network security applications or tools may be any application or tool used to secure a computer system or network, any application or tool used to control or monitor the operation of a computer system or network, or any application or tool used to remove or mitigate detected threats. Examples of network security applications or tools that may be used with the integrated computer security and threat prevention and detection platform of the present invention include, but are not limited to, firewalls, malware detectors, virus detectors, network activity monitors, bandwidth monitors, traffic monitors, access controls, email monitors, vulnerability scanners, endpoint security monitors, and other network security applications or tools known in the art. The network security tools may be hardware devices, software applications, or hybrid hardware/software devices and/or applications. The network security applications may be running at any level within a monitored network, such as at the network level or on any individual component, system, or machine connected to the monitored network. The communication paths between the central processor 102 and the individual network security applications 106*a*, 106*b*, 106*c*, 106*d*, through 106*n* as depicted in FIG. 6 are exemplary only, communication from each application to the central processor may be direct or may be accomplished through layers of communication, such as through existing networks or other system interconnections.

Central processor 102 may be any combination of processors, computers, or servers, with implementation of the integrated computer security and threat prevention and detection firewall being accomplished either on a single such component or via implementation on a distributed platform, such as across multiple servers. In addition, the claimed platform may be distributed through the Internet or other wide area network, with coordinated communication between various modules and parts of the platform.

Display 104 is preferably a computer monitor or screen, or array of computer monitors or screens, that provides a visual representation of aggregated data from the central processor 102. In exemplary embodiments of screen displays depicted herein in FIGS. 1 through 4, the aggregated data from the central processor is presented in predefined arrangement. In one embodiment of the present invention, the displayed aggregated data comprises: network usage data, network threats data, application usage data, threat mitigation data, malware activity data, virus activity data, and combinations thereof. In other embodiments within the scope of the present invention a user, such as a system administrator, may select the data and information to be displayed and the arrangement of the data on the dashboard display. Most preferably, preferred arrangements and presentation of data may be saved by a user for future use.

Figure 5:
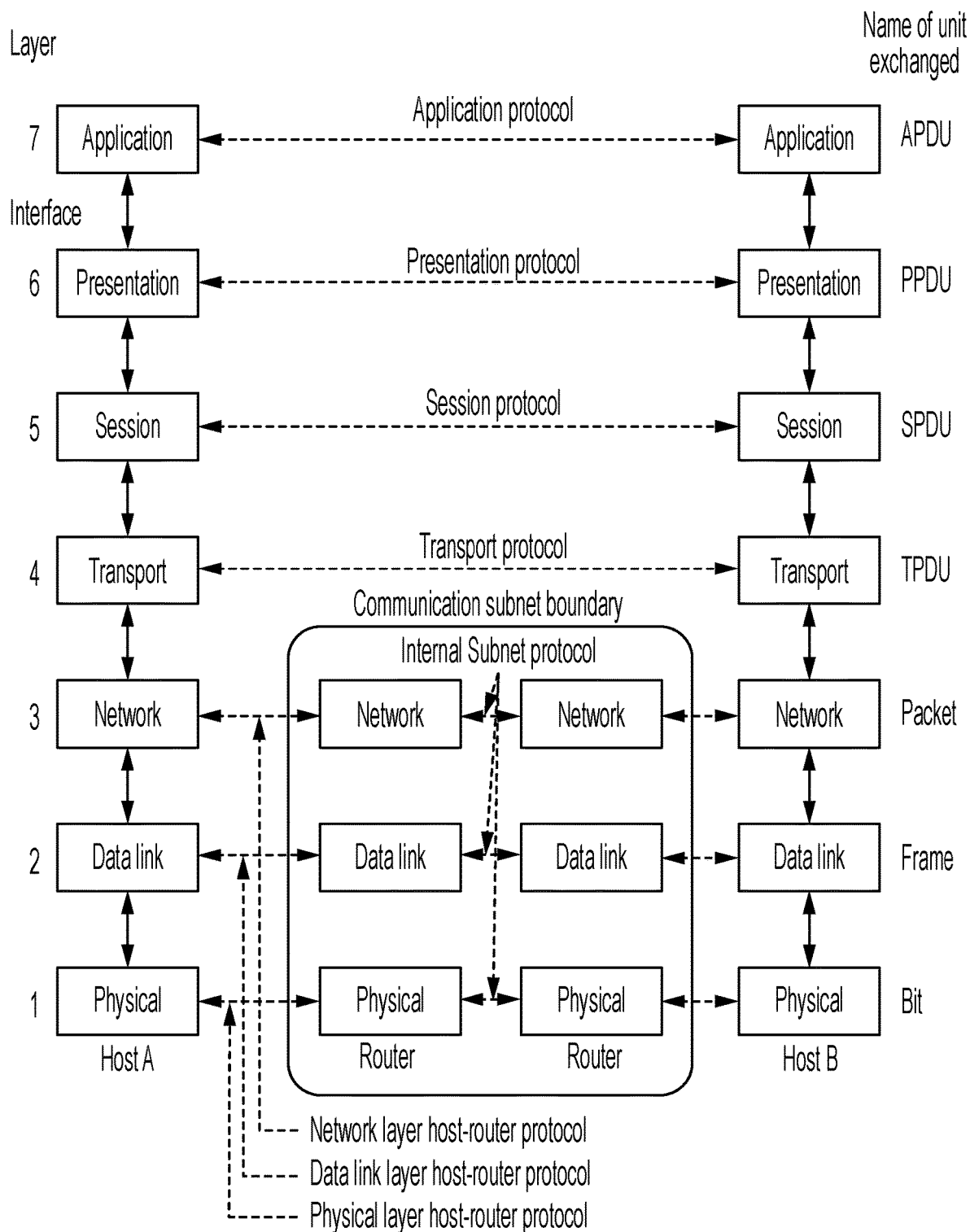
FIG. 5 is a block diagram depiction of a layered view of an exemplary interaction between various concurrently running applications and network security applications that provide information to the integrated computer network security and threat prevention and detection platform in accordance with an exemplary embodiment of the present invention.

Turning now to FIG. 5, a block diagram of an OSI (Open Systems Interconnection) model of a typical configuration of applications, operating systems, network card device drivers, and networking hardware that enable network communications is depicted. The OSI model represents the process of communication between two endpoints in a telecommunication network divided into seven distinct groups of related functions, depicted as distinct layers, with each communicating user or program of a computing device able to provide those seven layers. Thus, for any given message between users, between programs, or between users and programs, there will be a flow of data down through the layers in the source computer, across the network and then up through the layers in the receiving computer.

Looking still to FIG. 5, layer 7 is the layer at which communication partners are identified (i.e., is there a user or device to communicate with), the network capacity is assessed (i.e., will the network allow communication with that device), and a communication to send is created, or a received communication is opened. It should be understood that layer 7 is not the application itself, it is the set of network services the application should be able to use directly.

Layer 6 is the presentation layer, typically part of an operating system (OS). Layer 6 converts incoming an outgoing data from one presentation format to another, e.g., form clear text to encrypted text at one end and from encrypted text to clear text at the other.

Layer 5 it the session layer that sets up, coordinates, and terminates conversations, provides authentication and reconnection after an interruption. Layer 4 is the transport layer that manages packetization of data and delivery of the packets, including checking for errors in the data once it arrives.

On the Internet, the services of layers 4 and 5 are provided by Transmission Control Protocol (TCP) and User Datagram Protocol (UDP) for most applications.

Layer 3 is the network layer that handles the addressing and routing of data (i.e., sending it in the right direction to the right destination on outgoing transmissions and receiving incoming transmissions at the packet level). On the Internet, layer 3 services are handled via Internet Protocol (IP).

Layer 2 is the data link layer, which sets up links across the physical network, putting packets into network frames. Layer 2 includes two sub-layers, a Logical Link Control Layer and Media Access Control Layer. Layer 2 is typically implemented via Ethernet.

Layer 1 is the physical layer which conveys a bit stream through the network via electrical, optical, or radio communication to provide the hardware means of sending and receiving data on a network.

Looking to FIGS. 5 and 6 in conjunction, the integrated computer network security and threat prevention and detection platform 100 of the present invention works in conjunction with hardware and software of one or more networks as described with respect to FIG. 5 to provide network communication analytics and threat prevention and detection at the various layers for each user, device, and program of networks to be protected.

Most preferably, the network security applications or tools 106*a*, 106*b*, 106*c*, 106*d*, through 106*n* are implemented in hardware and/or software running in any of the network layers as described in FIG. 5. The central processor 102 communicates with each of the network security applications or tools, preferably using hooks or application program interfaces (APIs) of the various analytic and security tools, and directs those tools to gather and/or transmit various information and data to be displayed on the system dashboard display as will be described in more detail below. APIs are known in the art and provide a defined method of communication and protocols for the interchange of information and collection of data from those programs.

For example, in one embodiment, a virtual firewall is implemented on a layer of the network(s) to be protected and communication to the various security and analytical tools is implemented over the Internet. In other embodiments, the firewall is implemented in hardware connected to the network(s), either alone or in conjunction with router functionality, and communication with the firewall/hardware is implemented. In further embodiments, a hybrid system comprising a combination of hardware and virtual implementation is employed.

One exemplary data collection and analytic tool is an Elastic Stack or ELK STACK™ comprising a combination of Elasticsearch™, Logstash™, and Kibana™ applications to search, collect, and parse network traffic data and provide access to that data in a defined protocol. The integrated computer network security and threat prevention and detection platform system of the present invention preferably interfaces to the ELK STACK™ and aggregates the data via the central processor 102 into a form usable by the dashboard web pages presented on the display 104 to a system administrator or other user.

As just described, in use of the platform of the present invention, various individual security and network analytical tools, such as firewalls, endpoint security, email security, and Unified Threat Management (UTM) systems, are implemented into one or more networks to be protected. The central processor 102 communicates with those multiple individual tools and aggregates relevant data from each, then provides an integrated dashboard view of sophisticated analytics related to network usage, traffic, and threats to the display 104 in order to allow a system administrator to view the aggregated information.

Looking to FIG. 1, a screen shot of an interactive Overview web page of network usage, network threats, and application usage of an integrated computer network security and threat prevention and detection platform in accordance with an exemplary embodiment of the present invention is depicted. Along the left-hand side of the Overview display, the integrated computer network security and threat prevention and detection platform of the present invention displays a total number of: threats mitigated, malware activity, and virus activity. At the center of the display a timeline view of the number and type of threats encountered and detected is presented, along with a timeline view of network bandwidth usage. At the right-hand side of the display an overall "Risk Rating" is presented, providing a single metric indicating the current risk level in the network based on a weighted aggregation of various analytics and threats detected by the various individual security products in use. Finally, an indicator of various software applications currently running on the network is presented at the lower right-hand corner of the display.

It should be understood that the Overview page presents a collection and aggregation of various analytics and threats as detected by the various individual security tools running individually on the network. The Overview display (along with other displays as will be discussed herein below) thus provides an aggregate view of the entire network traffic and threat level that is not provided or available from any of the individual security tools running on the network. It should be further understood that the Overview display comprises informational displays that may also presented on other pages of the integrated computer network security and threat prevention and detection platform, thus the Overview page provides an at-a-glance view of the overall threats, with the following pages displaying further detail and views of the threats and network traffic.

In exemplary embodiments, in addition to aggregating and displaying information form the plurality of network security applications and tools, the central processor 102 is further operable to analyze and act on the aggregated data and to isolate detected threats from the network. For example, a detected virus or malware threat is detected may be isolated from the network by restricting network access to the machine or component on which the threat is detected, by shutting down the affected machine or component, by monitoring and blocking communication over the network from the affected machine or component and/or communication emanating from the detected threat, or combinations of actions. Thus, in addition to notifying a system administrator of the detected threat, the central processor 102 takes affirmative steps to eliminate the threat from the network and to mitigate further propagation of the threat throughout the network.

Likewise, unauthorized access to the network is detected by the central processor 102 via a device's IP address, MAC address, key signature, or via detection of unusual or unexpected activity by the device, and the threat is isolated by restricting the device's access to the network and the system administrator is notified via a display.

Thus, the central processor 102 and display 104 provide a dashboard window to a system administrator to activity on the network, with the central processor further monitoring and acting to isolate detected threats in addition to displaying information.

Figure 2:
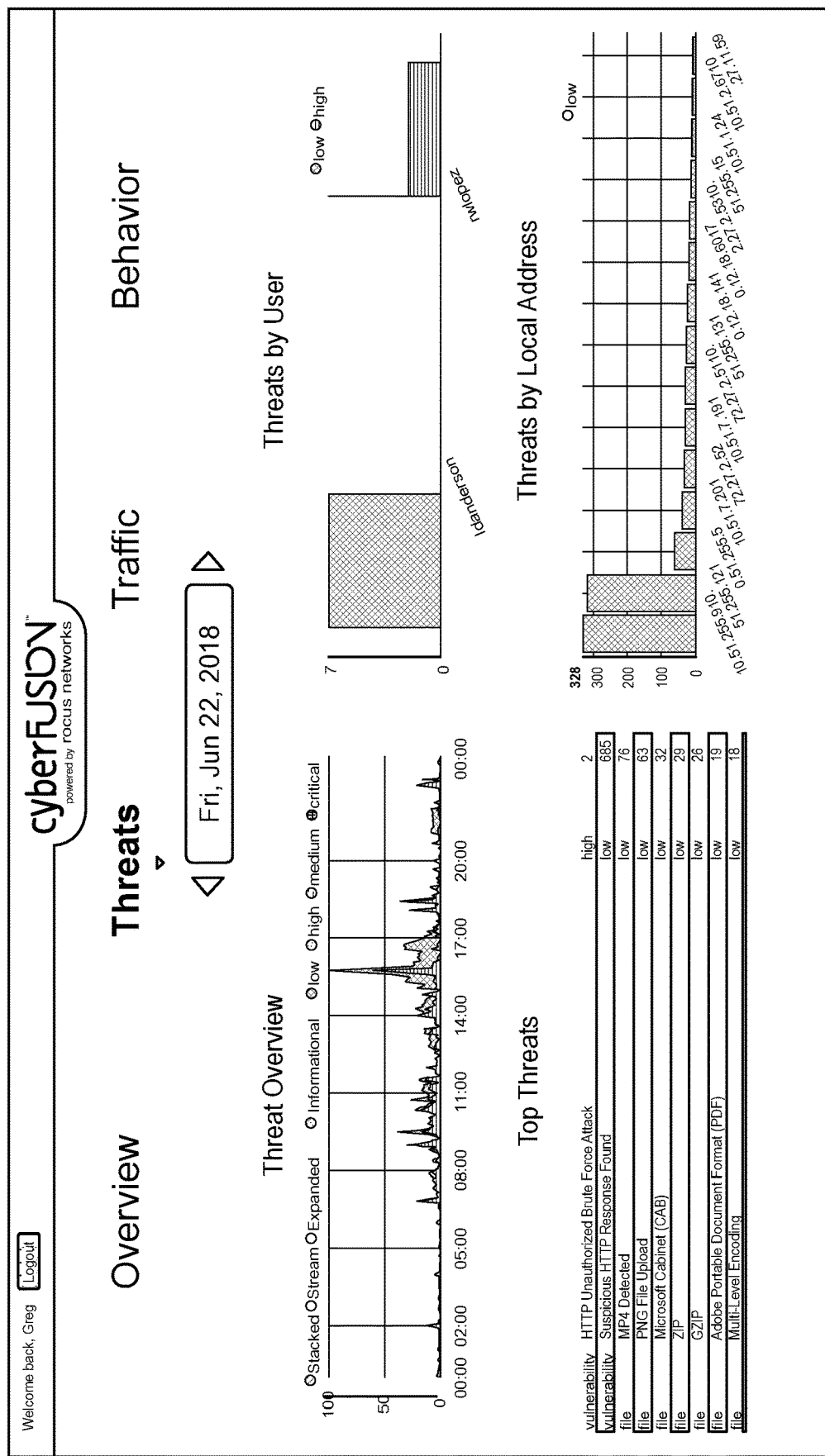
FIG. 2 is a screen shot of an interactive Threats display of network threats of an integrated computer network security and threat prevention and detection platform in accordance with an exemplary embodiment of the present invention.

Turning to FIG. 2, an interactive Threats web page presents a dashboard view of various threats on the system in various forms. A Threat Overview display presents a timeline view of the type and severity of various threats found on the network, with a Top Threats display presenting a scrollable list of all threats detected on the network, rated by their severity—i.e., with the most critical threats listed first.

A Threats by User display presents a listing of users, devices, or programs having the greatest number of threats, in a scrollable list form, with a Threats by Local Address display presenting the local IP addresses associated with the greatest number of threats. It should be understood that in various embodiments that the listings and orderings of the listings may be sorted by various criteria, such as by user name, threat name, threat severity, etc. In one embodiment of the present invention, the central processor calculates a system risk rating based on data aggregated from the plurality of network securing applications.

Figure 3:
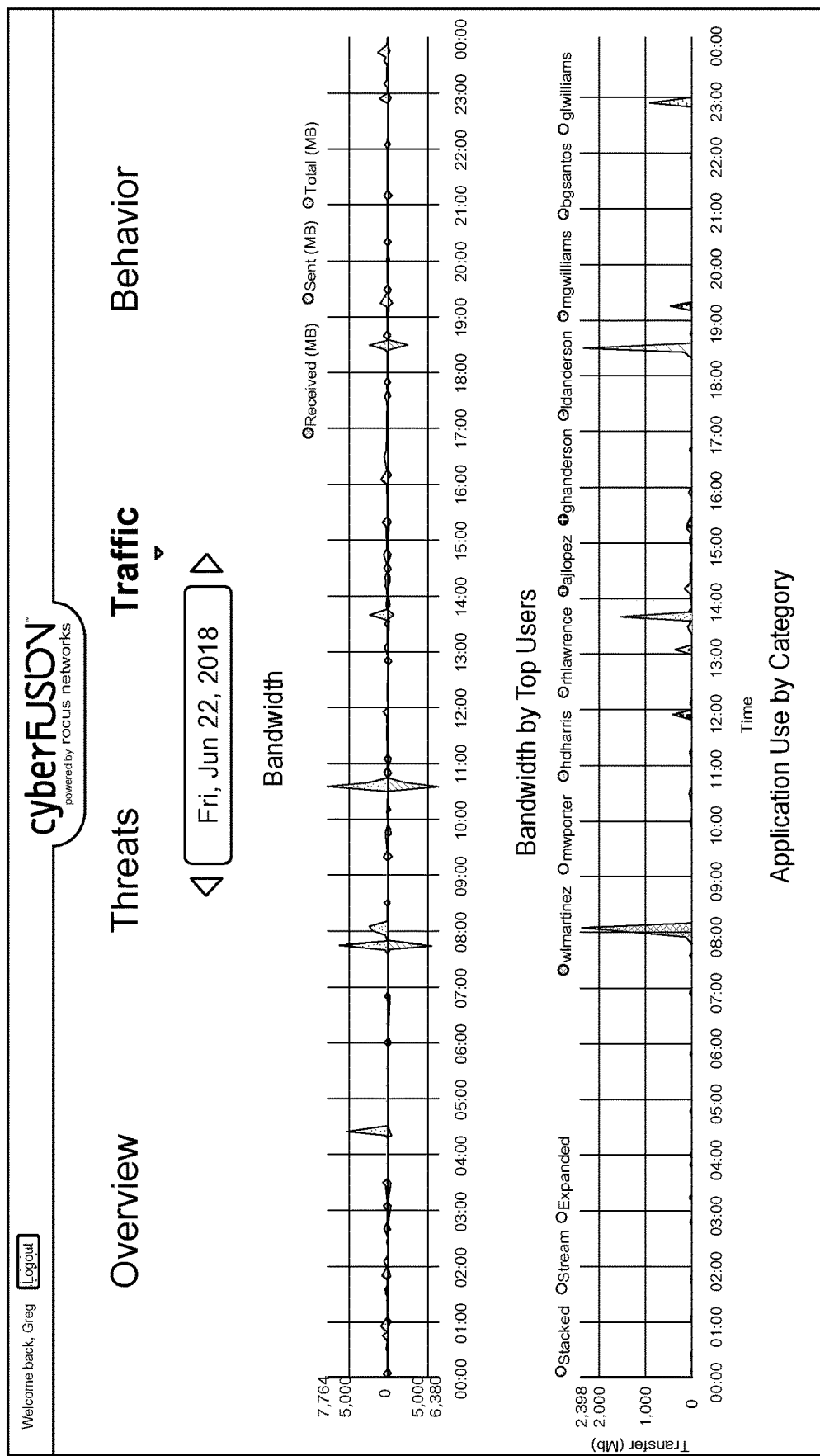
FIG. 3 is a screen shot of an interactive Traffic display of network usage of an integrated computer network security and threat prevention and detection platform in accordance with an exemplary embodiment of the present invention.

Turning to FIG. 3, an interactive Traffic web page presents a dashboard view of various threats on the system in various forms. A Bandwidth display shows bandwidth usage by user, with the total, sent, and received data color coded, with a Bandwidth by Top Users display presenting bandwidth usage by user, and an Application use by Category display presenting the applications in use by various users of the network(s).

Figure 4:
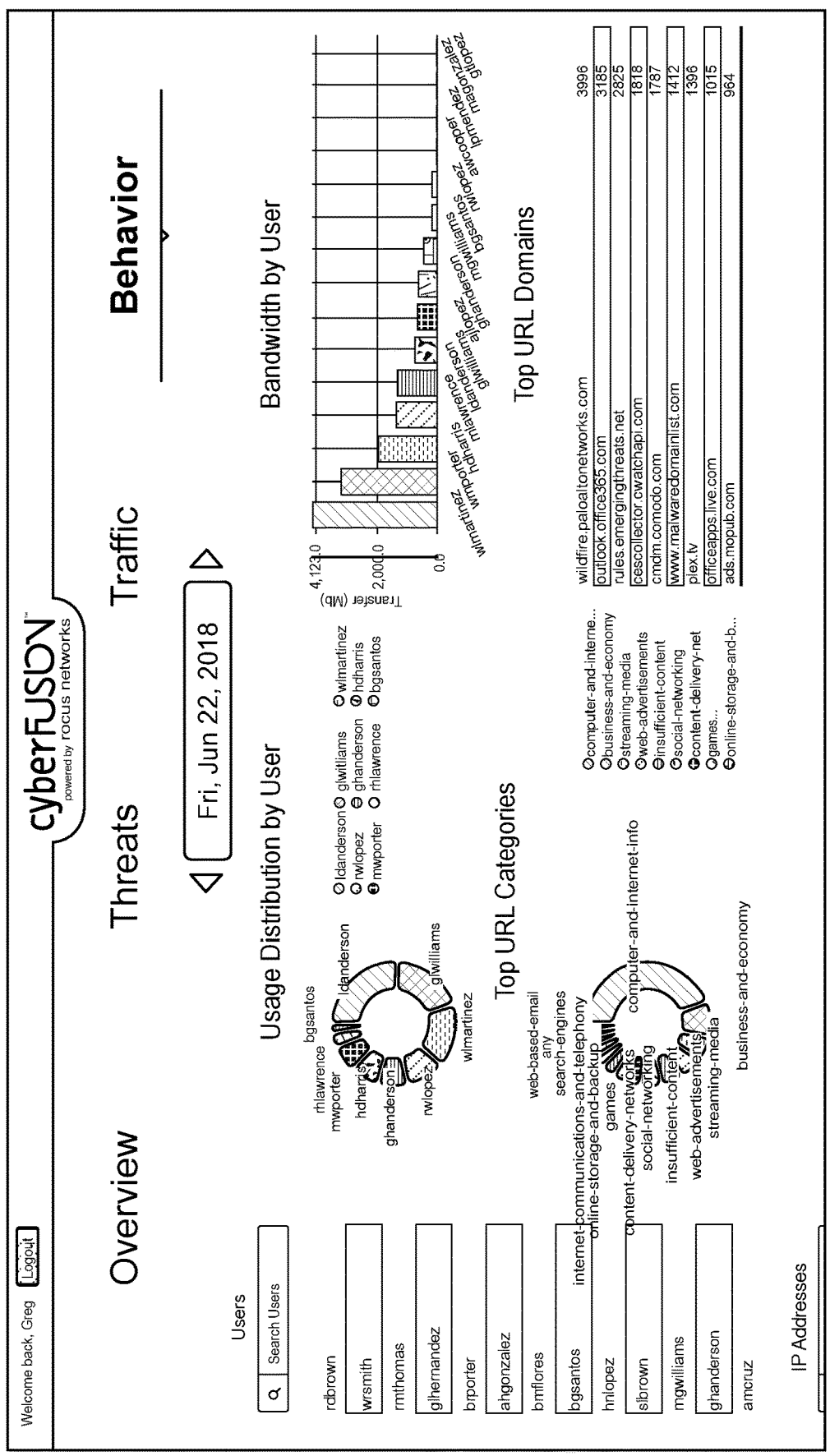
FIG. 4 is a screen shot of an interactive Behavior display of network usage of an integrated computer network security and threat prevention and detection platform in accordance with an exemplary embodiment of the present invention.

Turning to FIG. 4, an interactive Behavior web page presents a dashboard view of various network traffic analytics. A Users display at the left-hand side of the display presents a scrollable list of current users of the system, with a scrollable list of IP Addresses in use on the network presented directly below. At the center of the page, a listing of Usage Distributions by user and Top URL categories listings are available. And, at the right-hand side of the display, a listing of Bandwidth by User and a listing of Top URL Domains is presented.

Thus, as seen in the four web pages of FIGS. 1 through 4, the integrated computer network security and threat prevention and detection platform of the present invention captures and aggregates information and data from various of a plurality of individual security and network analytic tools, and presents the disparate data in a concise dashboard display that allows a system administrator of a network to quickly and immediately see network traffic and threat information to ascertain the performance and security status of the network(s) under view.

From the above, it can be seen that the integrated computer network security and threat prevention and detection platform of the present invention can be employed to provide a unitary dashboard presentation of network traffic and security information to a user of information provided by various individual or standalone security and analytics tools, in a method that is not available or possible with any of the individual products.

Many different arrangements and configuration of the system described and depicted, as well as components and features not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

Any method described herein may incorporate any design element contained within this application and any other document/application incorporated by reference herein.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

The present invention may be embodied in other forms without departing from the spirit and the essential attributes thereof, and, accordingly, reference should be made to the appended claims, rather than to the foregoing specification, as indicating the scope of the invention. The invention illustratively discloses herein suitably may be practiced in the absence of any element which is not specifically disclosed herein.

The invention claimed is:

1. A method comprising:
   receiving, at a central processor, first network security data from at least one first network security application configured to monitor a first network communication layer in a computer network, wherein the first network communication layer is one of a physical layer, a data link layer, a network layer, a transport layer, a session layer, a presentation layer, or an application layer, and second network security data from at least one second network security application configured to monitor a second network communication layer in the computer network, wherein the second network communication layer is a different one of the physical layer, the data link layer, the network layer, the transport layer, the session layer, the presentation layer, and the application layer, wherein the first network security data comprises network usage data, network threats data, application usage data, threat mitigation data, malware activity data, virus activity data, or combinations thereof, and wherein the second network security data comprises network usage data, network threats data, application usage data, threat mitigation data, malware activity data, virus activity data, or combinations thereof;
   aggregating and weighting, by the central processor, the first and second network security data, resulting in weighted aggregated data; and
   providing, by the central processor, an integrated dashboard presentation that includes both a timeline view of threats found in the computer network and a single indication of an overall risk level in the computer network, including at the first network communication layer and at the second network communication layer, the overall risk level determined based on the weighted aggregated data.

2. The method of claim 1, wherein the first network security application comprises a firewall, network traffic monitor, access controller, email monitor, vulnerability scanner, endpoint security monitor, malware detector, virus detector, bandwidth usage monitor, or a combination thereof.

3. The method of claim 1, wherein aggregating and weighting of the first and second network security data comprises collecting and parsing network traffic data by the central processor to obtain the weighted aggregated data.

4. The method of claim 1, wherein the integrated dashboard presentation includes an aggregate view of network traffic and a threat level for the network that includes data that is unavailable from any one of the at least one first network security applications and the at least one second network security applications.

5. The method of claim 1, wherein the first network security data or the second network security data is received by the central processor via an application program interface (API) made available by the at least one first network security application or the at least one second network security application.

6. A method comprising:
   receiving, at a central processor, first network security data from at least one first network security application configured to monitor an application layer in a computer network and second network security data from at least one second network security application configured to monitor a second layer of the computer network other than the application layer, wherein the second layer is one of a physical layer, a data link layer, a network layer, a transport layer, a session layer, or a presentation layer in the computer network, wherein the first network security data comprises application usage data, and wherein the second network security data comprises network usage data, network threats data, threat mitigation data, malware activity data, virus activity data, or combinations thereof;
   aggregating and weighting, by the central processor, the first and second network security data, resulting in weighted aggregated data; and
   providing, by the central processor, an integrated dashboard presentation that includes both a view of a plurality of application layer threats found in the computer network and a single indication of an overall risk level in the computer network, including at the application layer and at the second layer, the overall risk level determined based on the weighted aggregated data.

7. The method of claim 6, wherein the first network security application comprises a firewall, network traffic monitor, access controller, email monitor, vulnerability scanner, endpoint security monitor, malware detector, virus detector, bandwidth usage monitor, or a combination thereof.

8. The method of claim 7, wherein aggregating and weighting of the first and second network security data comprises collecting and parsing network traffic data by the central processor to obtain the weighted aggregated data.

9. The method of claim 7, wherein the integrated dashboard presentation includes an aggregate view of network traffic and a threat level for the network that includes data that is unavailable from any one of the at least one first network security applications and the at least one second network security applications.

10. The method of claim 6, wherein the first network security data or the second network security data is received by the central processor via an application program interface (API) made available by the at least one first network security application or the at least one second network security application.

11. The method of claim 6, wherein the at least one first network security application or the at least one second network security application is one of a firewall, an endpoint security application, an email security application, or a Unified Threat Management (UTM) system.

12. The method of claim 6, wherein the integrated dashboard presentation includes a at least one of a total number of threats mitigated over a first time period, malware activity over the first time period, and/or virus activity over the first time period.

13. The method of claim 6, wherein the integrated dashboard presentation includes a timeline view of a number and a type of threats encountered.

14. A method comprising:
receiving, at a central processor, first network security data from at least one first network security application configured to monitor a first network communication layer in a computer network, wherein the first network communication layer is one of a physical layer, a data link layer, a network layer, a transport layer, a session layer, a presentation layer, or an application layer, and second network security data from at least one second network security application configured to monitor a second network communication layer in the computer network, wherein the second network communication layer is a different one of the physical layer, the data link layer, the network layer, the transport layer, the session layer, the presentation layer, and the application layer;
aggregating and weighting, by the central processor, the first and second network security data, resulting in weighted aggregated data; and
providing, by the central processor, an integrated dashboard presentation that includes a timeline view of threats found in the computer network, a total number of a plurality of threats mitigated within the computer network over a time period, and a single indication of an overall risk level in the computer network, including at the first network communication layer and at the second network communication layer, the overall risk level determined based on the weighted aggregated data.

15. The method of claim 14, wherein the first network security data or the second network security data is received by the central processor via an application program interface (API) made available by the at least one first network security application or the at least one second network security application.

16. The method of claim 14, wherein the first network security application comprises a firewall, network traffic monitor, access controller, email monitor, vulnerability scanner, endpoint security monitor, malware detector, virus detector, bandwidth usage monitor, or a combination thereof.

17. The method of claim 14, wherein the integrated dashboard presentation includes an aggregate view of network traffic and a threat level for the network that includes data that is unavailable from any one of the at least one first network security applications and the at least one second network security applications.

* * * * *